(12) United States Patent
He et al.

(10) Patent No.: US 9,049,083 B2
(45) Date of Patent: Jun. 2, 2015

(54) BASE STATION ANTENNA AND BASE STATION ANTENNA FEED NETWORK

(71) Applicant: Huawei Technologies Co., Ltd., Shenzhen (CN)

(72) Inventors: Pinghua He, Shenzhen (CN); Ming AI, Shenzhen (CN); Weihong Xiao, Shenzhen (CN); Zuwu Zhu, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 0 days.

(21) Appl. No.: 14/567,247

(22) Filed: Dec. 11, 2014

(65) Prior Publication Data

US 2015/0098495 A1 Apr. 9, 2015

Related U.S. Application Data

(63) Continuation of application No. PCT/CN2012/076725, filed on Jun. 11, 2012.

(51) Int. Cl.
*H04B 1/38* (2006.01)
*H04L 5/16* (2006.01)
*H04L 27/18* (2006.01)
*H01Q 3/34* (2006.01)
*H04B 10/40* (2013.01)

(52) U.S. Cl.
CPC .................. *H04L 27/18* (2013.01); *H01Q 3/34* (2013.01); *H04B 10/40* (2013.01)

(58) Field of Classification Search
CPC ........... H04L 27/18; H04B 10/40; H01Q 3/34

USPC .................................................. 375/219, 220
See application file for complete search history.

(56) References Cited

U.S. PATENT DOCUMENTS

| | | | |
|---|---|---|---|
| 4,045,800 A | 8/1977 | Tang et al. | |
| 4,228,436 A * | 10/1980 | DuFort | 342/371 |
| 7,450,066 B2 | 11/2008 | Haskell | |
| 8,755,454 B2 * | 6/2014 | Sorrells et al. | 375/295 |
| 2005/0152469 A1 * | 7/2005 | Fusco et al. | 375/295 |
| 2005/0184906 A1 * | 8/2005 | Nakaya et al. | 342/377 |
| 2008/0211716 A1 | 9/2008 | Haskell | |
| 2009/0322610 A1 | 12/2009 | Hants et al. | |
| 2010/0164802 A1 * | 7/2010 | Li et al. | 342/372 |

(Continued)

FOREIGN PATENT DOCUMENTS

| | | |
|---|---|---|
| CN | 1795581 A | 6/2006 |
| CN | 1805214 A | 7/2006 |

(Continued)

*Primary Examiner* — Qutbuddin Ghulamali
(74) *Attorney, Agent, or Firm* — Leydig, Voit & Mayer, Ltd.

(57) ABSTRACT

Embodiments of the present invention relate to the field of communications technologies, and provide a base station antenna and a base station antenna feed network. The base station antenna includes a transceiver array, a first-level vector synthesis network, a second-level phase shifter array, a second-level vector synthesis network, and an antenna unit array. By using the second-level vector synthesis network, the base station antenna makes phase differences between multiple vector signals sent to antenna units smoother, thereby extending an adjustable range of a downtilt on the premise that the number of transceivers is as small as possible.

12 Claims, 4 Drawing Sheets

(56) References Cited

U.S. PATENT DOCUMENTS

2012/0086602 A1* 4/2012 Park et al. ............... 342/372
2012/0319746 A1* 12/2012 Hayashi et al. ........... 327/141

FOREIGN PATENT DOCUMENTS

CN 1921341 A 2/2007
CN 101578737 A 11/2009

* cited by examiner

BASE STATION ANTENNA AND BASE STATION ANTENNA FEED NETWORK

CROSS-REFERENCE TO RELATED APPLICATIONS

This application is a continuation of International Patent Application No. PCT/CN2012/076725, filed on Jun. 11, 2012, which is hereby incorporated by reference in its entirety.

TECHNICAL FIELD

The present invention relates to the field of communications technologies, and in particular, to a base station antenna and a base station antenna feed network.

BACKGROUND

As an important component of a mobile communications network, a base station antenna is responsible for the functions of transmitting and receiving electromagnetic waves. The performance of the mobile communications network is directly affected by the performance of the base station antenna, and a downtilt is an important contributor to the performance of the base station antenna.

In an active base station antenna system, two or more TRXs (Transceiver) and a vector synthesis feed network feed power to multiple antenna units to produce a radiation beam with a downtilt angle. The inventor finds that when the number of TRXs is relatively small, for example, there are only two TRXs, an adjustable range of a downtilt of the base station antenna is relatively narrow, making it difficult to meet actual requirements of a communications system.

SUMMARY

Embodiments of the present invention provide a base station antenna and a base station antenna feed network, which can achieve a purpose of adjusting a downtilt of the base station antenna within a relatively wide range when the number of TRXs is relatively small.

According to one aspect, an embodiment of the present invention provides a base station antenna, and the base station antenna includes: a transceiver TRX array, a first-level vector synthesis network, a second-level phase shifter array, a second-level vector synthesis network, and an antenna unit array, where:
the TRX array includes N TRXs, which are configured to output N vector signals, where N is a natural number greater than or equal to 2;
the first-level vector synthesis network is configured to implement vector synthesis for the N vector signals to generate M vector signals, where M is a natural number and M is greater than N;
the second-level phase shifter array is configured to receive the M vector signals output by the first-level vector synthesis network, change phases of the M vector signals and output M phase-shifted vector signals, where phase shift amounts of the M vector signals after passing through the second-level phase shifter array are an arithmetic progression;
the second-level vector synthesis network is configured to receive the M phase-shifted vector signals, divide the M vector signals into P vector signals, implement vector synthesis for Q vector signals in the P vector signals and output Q synthesized vector signals, and directly output a vector signal except the Q vector signals in the P vector signals, where P is a natural number and P is greater than M, and Q is a natural number and less than or equal to P; and
the antenna unit array is configured to receive the P vector signals output by the second-level vector synthesis network and convert the P vector signals into electromagnetic waves for radiating.

According to another aspect, an embodiment of the present invention provides a base station antenna feed network, and the base station antenna feed network includes: a first-level vector synthesis network, a second-level phase shifter array, and a second-level vector synthesis network, where:
the first-level vector synthesis network is configured to receive N vector signals output by N transceivers TRXs and implement vector synthesis for the N vector signals to generate M vector signals, where N and M are natural numbers and M is greater than N;
the second-level phase shifter array is configured to receive the M vector signals output by the first-level vector synthesis network, change phases of the M vector signals and output M phase-shifted vector signals, where phase shift amounts of the M vector signals after passing through the second-level phase shifter array are an arithmetic progression; and
the second-level vector synthesis network is configured to receive the M phase-shifted vector signals, divide the M vector signals into P vector signals, implement vector synthesis for Q vector signals in the P vector signals and output Q synthesized vector signals to an antenna unit array, and directly output a vector signal except the Q vector signals in the P vector signals to the antenna unit array, where P is a natural number and P is greater than M, and Q is a natural number and less than or equal to P.

According to the base station antenna and the base station antenna feed network provided in the embodiments of the present invention, a second-level vector synthesis network is used to enable electromagnetic waves radiated from an antenna unit array to form relatively continuous wavefronts on the premise that the number of transceivers is relatively small, thereby extending an adjustable range of a downtilt of the base station antenna.

BRIEF DESCRIPTION OF DRAWINGS

To describe the technical solutions in the embodiments of the present invention or in the prior art more clearly, the following briefly introduces the accompanying drawings required for describing the embodiments or the prior art. Apparently, the accompanying drawings in the following description show merely some embodiments of the present invention, and a person of ordinary skill in the art may still derive other drawings from these accompanying drawings without creative efforts.

DESCRIPTION OF EMBODIMENTS

The following clearly and completely describes the technical solutions in the embodiments of the present invention with reference to the accompanying drawings in the embodiments of the present invention. Apparently, the described embodiments are merely a part rather than all of the embodiments of the present invention. All other embodiments obtained by a person of ordinary skill in the art based on the embodiments of the present invention without creative efforts shall fall within the protection scope of the present invention.

Figure 1:
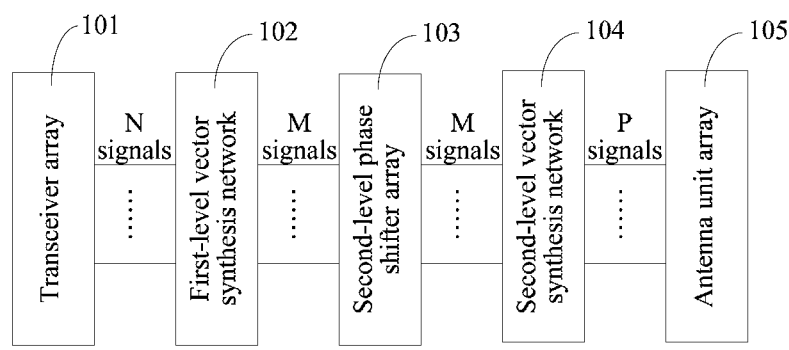
FIG. 1 is a schematic structural diagram of a base station antenna according to an embodiment of the present invention.

An embodiment of the present invention provides a base station antenna, and as shown in FIG. 1, the base station antenna includes:
a TRX (Transceiver) array 101, a first-level vector synthesis network 102, a second-level phase shifter array 103, a second-level vector synthesis network 104, and an antenna unit array 105.

The TRX array 101 includes N TRXs, which are configured to output N vector signals, where N is a natural number greater than or equal to 2;
amplitudes and phases of the N vector signals may be adjusted independently, that is, the N TRXs may output different vector signals.

The first-level vector synthesis network 102 is configured to implement vector synthesis for the N vector signals to generate M vector signals, where M is a natural number and M is greater than N.

The second-level phase shifter array 103 is configured to receive the M vector signals output by the first-level vector synthesis network, change phases of the M vector signals, and output M phase-shifted vector signals, where phase shift amounts of the M vector signals after passing through the second-level phase shifter array are an arithmetic progression.

The second-level vector synthesis network 104 is configured to receive the M phase-shifted vector signals, divide the M vector signals into P vector signals, implement vector synthesis for Q vector signals in the P vector signals and output Q synthesized vector signals, and directly output a vector signal except the Q vector signals in the P vector signals, where P is a natural number and P is greater than M; and Q is a natural number and less than or equal to P.

The antenna unit array 105 is configured to receive the P vector signals output by the second-level vector synthesis network and convert the P vector signals into electromagnetic waves for radiating.

In this embodiment, an exemplary combination of N and M in the first-level vector synthesis network is N=2 and M=4 or N=2 and M=6.

A phase of a signal output by each TRX may be adjusted independently. Therefore, the TRX array may be considered as a first-level phase shifter array, and the second-level phase shifter array further changes the phase of the vector signal output by the first-level vector synthesis network, so as to achieve a larger downtilt.

In this embodiment, if signals output by a phase shifter array are divided so as to drive multiple antenna units which are usually more than 10 units, for example, 12 antenna units, electromagnetic waves radiated from the antenna units form multiple independent wavefronts, and the multiple independent wavefronts are discontinuous, making it difficult for a downtilt range of the base station antenna to meet a requirement of an actual communications system. The second-level vector synthesis network smoothens phase differences between vector signals that drive the multiple antenna units. That is, the received M vector signals output by the second-level phase shifter array are divided into the P vector signals, and the P vector signals are synthesized to make a phase change of each signal smoother, so as to enable the electromagnetic waves radiated from the antenna units to form relatively continuous wavefronts, thereby extending an adjustable range of a downtilt of the base station antenna.

In this embodiment, optionally, a preset phase line may further be connected between each antenna unit in the antenna unit array and the second-level vector synthesis network, so as to further change a phase of a vector signal sent to the antenna unit, and change the downtilt of the base station antenna.

It should be noted that after passing through the second-level phase shifter array or the second-level vector synthesis network, one or more vector signals output by the first-level vector synthesis network may not have any change in phase or amplitude. That is, the one or more vector signals are directly connected to the second-level vector synthesis network or the antenna unit.

In this embodiment, when there is a relatively small number of transceivers, a feed network with the second-level vector synthesis network enables electromagnetic waves radiated from antenna units to form relatively continuous wavefronts, thereby extending an adjustable range of the downtilt of the base station antenna, improving sidelobe suppression of the base station antenna, and enhancing quality of coverage.

In this embodiment, an exemplary implementation is N=2, M=4, P=12, and Q=4. That is, the base station antenna uses two TRXs, and the first-level vector synthesis network implements vector synthesis for vector signals output by the two TRXs to obtain four vector signals. The second-level phase shifter array includes four phase shifters, each of which is used to change one vector signal output by the first-level vector synthesis network. Phase shift amounts of the four phase shifters are an arithmetic progression. The second-level vector synthesis network further implements vector synthesis for vector signals output by the four phase shifters to obtain 12 vector signals which are used to drive 12 antenna units.

Figure 2:
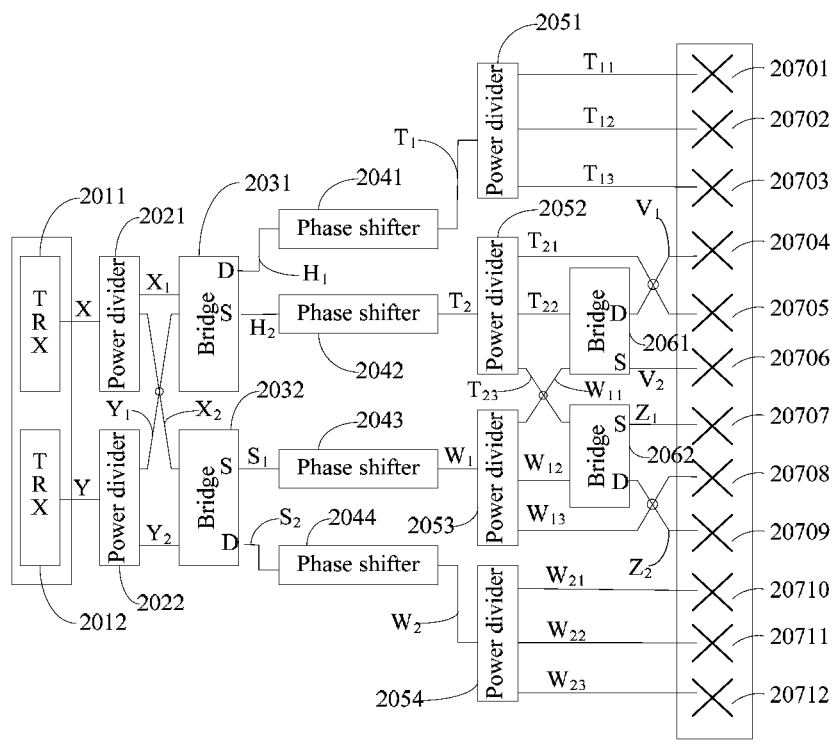
FIG. 2 is a schematic structural diagram of a base station antenna according to another embodiment of the present invention.

Specifically, as shown in FIG. 2, the two TRXs are a TRX 2011 and a TRX 2012 respectively. The first-level vector synthesis network includes a power divider 2021, a power divider 2022, a bridge 2031, and a bridge 2032. The second-level phase shifter array includes a phase shifter 2041, a phase shifter 2042, a phase shifter 2043, and a phase shifter 2044. The second-level vector synthesis network includes a power divider 2051, a power divider 2052, a power divider 2053, a power divider 2054, a bridge 2061, and a bridge 2062. The 12 antenna units are an antenna unit 20701 to an antenna unit 20712 respectively.

The TRX 2011 is connected to an input end X of the power divider 2021, and the TRX 2012 is connected to an input end Y of the power divider 2022. The power divider 2021 and the power divider 2022 each have one input end and two output ends, where the power divider 2021 has output ends X1 and X2, and the power divider 2022 has output ends Y1 and Y2. The output end X1 of the power divider 2021 and the output end Y1 of the power divider 2022 are connected to two input ends of the bridge 2031; the output end X2 of the power divider 2021 and the output end Y2 of the power divider 2022 are connected to two input ends of the bridge 2032. Output ends H1 and H2 of the bridge 2031 and output ends S1 and S2 of the bridge 2032 are connected to the phase shifter 2041, the phase shifter 2042, the phase shifter 2043, and the phase shifter 2044 respectively, where the output ends H1 and H2 are a D port and an S port respectively, and the output ends S1 and S2 are an S port and a D port respectively. Output ends T1, T2, W1, and W2 of the four phase shifters are connected to the power divider 2051, the power divider 2052, the power divider 2053, and the power divider 2054 respectively, where the four power dividers each have one input end and three output ends. The power divider 2051 has output ends T11, T12, and T13; the power divider 2052 has output ends T21, T22, and T23; the power divider 2053 has output ends W11, W12, and W13; and the power divider 2054 has output ends W21, W22, and W23. The 12 antenna units 20701 through 20712 are arranged in sequence. The three output ends T11, T12, and T13 of the power divider 2051 are connected to the antenna units 20701, 30702, and 20703 respectively; and the three output ends W21, W22, and W23 of the power divider 2054 are connected to the antenna units 20710, 20711, and 20712. The output end T21 of the power divider 2052 is connected to the antenna unit 20705; the output end T22 of the power divider 2052 and the output end W11 of the power divider 2053 are connected to two input ends of the bridge 2061, where two output ends V1 and V2 of the bridge 2061 are a D port and an S port respectively and are connected to the antenna units 20704 and 20706. The output end W13 of the power divider 2053 is connected to the antenna unit 20708; the output end T23 of the power divider 2052 and the output end W12 of the power divider 2053 are connected to two input ends of the bridge 2062, where two output ends Z1 and Z2 of the bridge 2062 are an S port and a D port respectively and are connected to the antenna units 20707 and 20709.

A hollow circle at the intersection of two lines in FIG. 2 indicates that the two lines are not connected to each other.

Further optionally, a preset phase line may be connected between an output end of the second-level vector synthesis network and a corresponding antenna unit.

Figure 3:
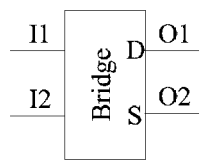
FIG. 3 is a schematic structural diagram of a bridge in the prior art.

In this embodiment, the bridges in the second-level vector synthesis network may be 180-degree bridges or 90-degree bridges, and bridges of a same type may be used in the first-level vector synthesis network. A 180-degree bridge is used as an example to describe a relationship between an input signal and an output signal. As shown in FIG. 3, I1 and I2 are input ports of the bridge, and O1 and O2 are output ports of the bridge, where O1 is a D port and O2 is an S port. Assuming that a, b, c, and d are signal parameters of ports I1, I2, O1, and O2 respectively, a value of c is obtained by multiplying $$\frac{\sqrt{2}}{2}$$

by a vector difference between a and b, and a value of d is obtained by multiplying $$\frac{\sqrt{2}}{2}$$

by a vector sum of a and b. Specific implementations of the 180-degree bridge and the 90-degree bridge are all conventional technologies. Details are not described herein again.

It should be noted that, in the example of this embodiment, the base station antenna transmits a signal. The base station antenna in this embodiment may also be used to receive a signal, and in this case, the antenna unit is used to receive a signal, the power divider is used as a combiner, and the TRX is used to receive a signal from the power divider. Processes of the signal transmitting and the signal receiving may or may not be performed simultaneously, which is not limited in this embodiment of the present invention. For example, in WCDMA (Wideband Code Division Multiple Access) and CDMA (Code Division Multiple Access) standards, signal transmitting and signal receiving are performed simultaneously. In the TD-SCDMA (Time Division-Synchronous Code Division Multiple Access) standard, signal transmitting and signal receiving are not performed simultaneously.

In addition, it should be noted that each of the four power dividers in the second-level vector synthesis network in this embodiment divides an input signal into three sub-signals, which is not limited in this embodiment of the present invention. Specifically, the total number of sub-signals obtained after the four power dividers divides input signals corresponds to the number of antenna units. For example, when there are only 10 antenna units, there are also 10 sub-signals obtained after the four power dividers perform signal division, where any two of the four power dividers in this embodiment may each divide an input signal into only two sub-signals.

In an actual application, the number of power dividers and bridges in the second-level vector synthesis network may be increased, so as to drive more antenna units. The specific number of power dividers or bridges depends on the specific number of antenna units in the antenna array, that is, if there are more antenna units, power dividers or bridges to be deployed may also increase correspondingly, which, however, increases complexity and footprint of the feed network. Therefore, in the actual application, preferably, two second-level bridges are deployed to extend an adjustable range of a downtilt to a maximum extent when the system is deployed in a space constrained environment.

According to the base station antenna provided in this embodiment of the present invention, a second-level vector synthesis network is added to a feed network, and a power divider and a bridge are used to make phase differences between multiple vector signals sent to antenna units smoother. In this way, on the premise that the number of TRXs is as small as possible, a wide adjustable range of a downtilt is achieved, thereby enhancing upper sidelobe suppression and increasing a gain. In addition, because a small number of TRXs are in use, production costs and energy consumption of the base station antenna are reduced, and the base station antenna also become more compact in size and provides reduced weight.

Figure 4:
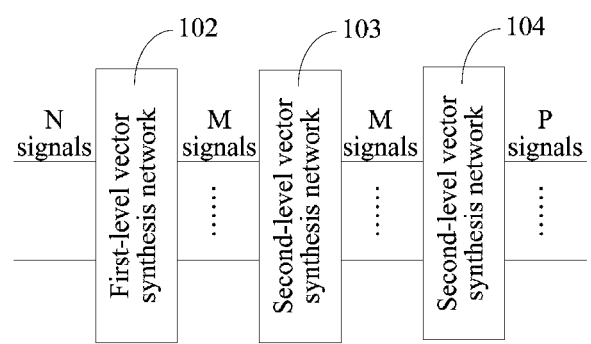
FIG. 4 is a schematic structural diagram of a base station antenna feed network according to an embodiment of the present invention.

An embodiment of the present invention further provides a base station antenna feed network, and as shown in FIG. 4, the base station antenna feed network includes: a first-level vector synthesis network 102, a second-level phase shifter array 103, and a second-level vector synthesis network 104.

The first-level vector synthesis network 102 is configured to receive N vector signals output by N transceivers TRXs and implement vector synthesis for the N vector signals to generate M vector signals, where N and M are natural numbers, and M is greater than N.

The second-level phase shifter array 103 is configured to receive the M vector signals output by the first-level vector synthesis network, change phases of the M vector signals, and output M phase-shifted vector signals, where phase shift amounts of the M vector signals after passing through the second-level phase shifter array are an arithmetic progression.

The second-level vector synthesis network 104 is configured to receive the M phase-shifted vector signals, divide the M vector signals into P vector signals, implement vector synthesis for Q vector signals in the P vector signals and output Q synthesized vector signals to an antenna unit array, and directly output a vector signal except the Q vector signals in the P vector signals to the antenna unit array, where P is a natural number and P is greater than M; and Q is a natural number and less than or equal to P.

In this embodiment, an exemplary combination of N and M in the first-level vector synthesis network is N=2 and M=4 or N=2 and M=6.

In this embodiment, the feed network may be used to feed power to a base station antenna unit array. If signals output by the phase shifter array are divided so as to drive multiple antenna units which are usually more than 10 units, for example, 12 antenna units, electromagnetic waves radiated from the antenna units form multiple independent wavefronts, and the multiple independent wavefronts are discontinuous, making it difficult for a downtilt range of a base station antenna to meet a requirement of an actual communications system. The second-level vector synthesis network smoothens phase differences between vector signals that drive the multiple antenna units. That is, the received M vector signals output by the second-level phase shifter array are divided into the P vector signals, and the P vector signals are synthesized to make a phase change of each signal smoother, so as to enable the electromagnetic waves radiated from the antenna units to form relatively continuous wavefronts, thereby extending an adjustable range of the downtilt of the base station antenna.

In this embodiment, an exemplary implementation is N=2, M=4, P=12, and Q=4.

Figure 5:
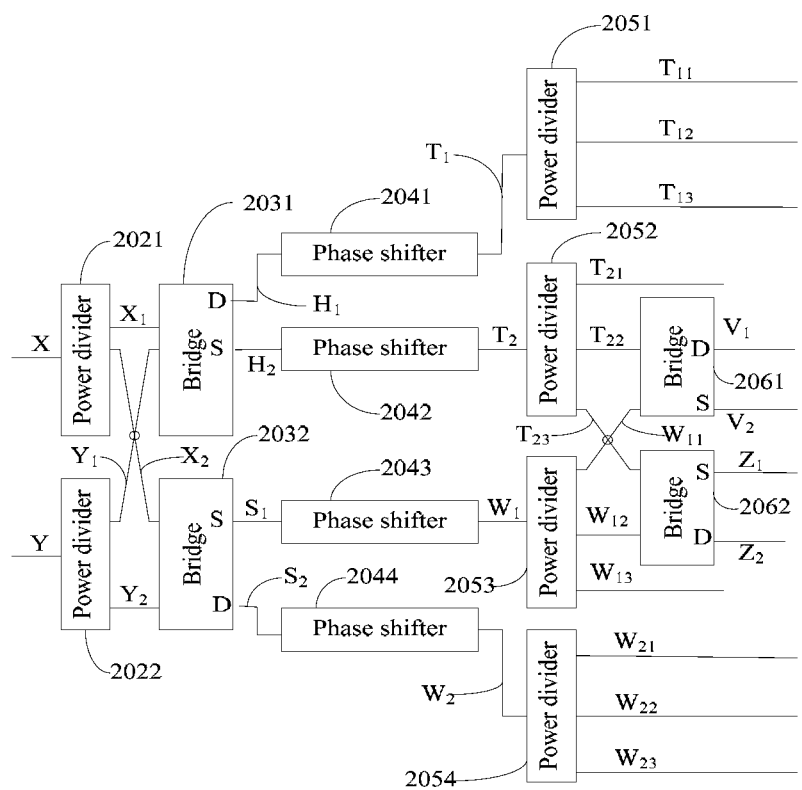
FIG. 5 is a schematic structural diagram of a base station antenna feed network according to another embodiment of the present invention.

Specifically, as shown in FIG. 5, the first-level vector synthesis network includes a power divider 2021, a power divider 2022, a bridge 2031, and a bridge 2032. The second-level phase shifter array includes a phase shifter 2041, a phase shifter 2042, a phase shifter 2043, and a phase shifter 2044. The second-level vector synthesis network includes a power divider 2051, a power divider 2052, a power divider 2053, a power divider 2054, a bridge 2061, and a bridge 2062.

The power divider 2021 and the power divider 2022 each have one input end and two output ends, where the power divider 2021 has output ends X1 and X2, and the power divider 2022 has output ends Y1 and Y2. The output end X1 of the power divider 2021 and the output end Y1 of the power divider 2022 are connected to two input ends of the bridge 2031; the output end X2 of the power divider 2021 and the output end Y2 of the power divider 2022 are connected to two input ends of the bridge 2032. Output ends H1 and H2 of the bridge 2031 and output ends S1 and S2 of the bridge 2032 are connected to the phase shifter 2041, the phase shifter 2042, the phase shifter 2043, and the phase shifter 2044 respectively, where the output ends H1 and H2 are a D port and an S port respectively, and the output ends S1 and S2 are an S port and a D port respectively. Output ends T1, T2, W1, and W2 of the four phase shifters are connected to the power divider 2051, the power divider 2052, the power divider 2053, and the power divider 2054 respectively, where the four power dividers each have one input end and three output ends. The power divider 2051 has output ends T11, T12, and T13; the power divider 2052 has output ends T21, T22, and T23; the power divider 2053 has output ends W11, W12, and W13; and the power divider 2054 has output ends W21, W22, and W23. The output end T22 of the power divider 2052 and the output end W11 of the power divider 2053 are connected to two input ends of the bridge 2061, where two output ends V1 and V2 of the bridge 2061 are a D port and an S port respectively. The output end T23 of the power divider 2052 and the output end W12 of the power divider 2053 are connected to two input ends of the bridge 2062, where two output ends Z1 and Z2 of the bridge 2062 are an S port and a D port respectively.

A hollow circle at the intersection of two lines in FIG. 5 indicates that the two lines are not connected to each other.

In this embodiment, the bridges in the second-level vector synthesis network may be 180-degree bridges or 90-degree bridges, and bridges of a same type may be used in the first-level vector synthesis network.

It should be noted that, in the example of the feed network in this embodiment, the base station antenna transmits a signal. The feed network in this embodiment may also be used to receive a signal, and in this case, the power divider is used as a combiner. Processes of the signal transmitting and the signal receiving may or may not be performed simultaneously, which is not limited in this embodiment of the present invention.

In addition, it should be noted that each of the four power dividers in the second-level vector synthesis network in this embodiment divides an input signal into three sub-signals, which is not limited in this embodiment of the present invention. Specifically, the total number of sub-signals obtained after the four power dividers divide input signals correspond to the number of antenna units that the four power dividers need to drive. For example, when there are only 10 antenna units that need to be driven, there are also 10 sub-signals obtained after the four power dividers perform signal division, where any two of the four power dividers in this embodiment may each divide an input signal into only two sub-signals.

The base station antenna feed network provided in this embodiment of the present invention may be used to receive output signals from two or more TRXs and drive an antenna unit array. A second-level vector synthesis network is added to the feed network, and a power divider and a bridge are used to make phase differences between multiple vector signals sent to antenna units smoother. In this way, on the premise that the number of TRXs is as small as possible, a wide adjustable range of a downtilt is achieved, thereby enhancing upper sidelobe suppression of a base station antenna and increasing a gain. In addition, because a small number of TRXs are in use, production costs and energy consumption of the base station antenna are reduced, and the base station antenna also becomes more compact in size and provides reduced weight.

The foregoing descriptions are merely specific implementations of the present invention, but are not intended to limit the protection scope of the present invention. Any variation or replacement readily figured out by a person skilled in the art within the technical scope disclosed in the present invention shall fall within the protection scope of the present invention. Therefore, the protection scope of the present invention shall be subject to the protection scope of the claims.

What is claimed is:

1. A base station antenna, comprising a transceiver (TRX) array, a first-level vector synthesis network, a second-level phase shifter array, a second-level vector synthesis network, and an antenna unit array, wherein:
   the TRX array comprises N TRXs, which are configured to output N vector signals, wherein N is a natural number greater than or equal to 2;
   the first-level vector synthesis network is configured to implement vector synthesis for the N vector signals to generate M vector signals, wherein M is a natural number and M is greater than N;

the second-level phase shifter array is configured to receive the M vector signals output by the first-level vector synthesis network, change phases of the M vector signals, and output M phase-shifted vector signals, wherein phase shift amounts of the M vector signals after passing through the second-level phase shifter array are an arithmetic progression;

the second-level vector synthesis network is configured to receive the M phase-shifted vector signals, divide the M vector signals into P vector signals, implement vector synthesis for Q vector signals in the P vector signals and output Q synthesized vector signals, and directly output a vector signal except the Q vector signals in the P vector signals, wherein P is a natural number and P is greater than M, and Q is a natural number and less than or equal to P; and the antenna unit array is configured to receive the P vector signals output by the second-level vector synthesis network and convert the P vector signals into electromagnetic waves for radiating.

2. The base station antenna according to claim 1, wherein N=2 and M=4.

3. The base station antenna according to claim 1, wherein N=2, M=4, P=12, and Q=4; the TRX array comprises a first TRX and a second TRX; the first-level vector synthesis network comprises a first power divider, a second power divider, a first bridge, and a second bridge; the second-level phase shifter array comprises a first phase shifter, a second phase shifter, a third phase shifter, and a fourth phase shifter; the second-level vector synthesis network comprises a third power divider, a fourth power divider, a fifth power divider, a sixth power divider, a third bridge, and a fourth bridge; and the antenna unit array comprises a first antenna unit to a twelfth antenna unit, wherein:

the first TRX is connected to an input end of the first power divider, and the second TRX is connected to an input end of the second power divider, wherein the first power divider and the second power divider each have one input end and two output ends; the first power divider has output ends X1 and X2, and the second power divider has output ends Y1 and Y2, wherein the output end X1 of the first power divider and the output end Y1 of the second power divider are connected to two input ends of the first bridge, and the output end X2 of the first power divider and the output end Y2 of the second power divider are connected to two input ends of the second bridge; output ends H1 and H2 of the first bridge and output ends S1 and S2 of the second bridge are connected to the first phase shifter, the second phase shifter, the third phase shifter, and the fourth phase shifter respectively, wherein the output ends H1 and H2 are a D port and an S port respectively, and the output ends S1 and S2 are an S port and a D port respectively; output ends T1, T2, W1, and W2 of the first phase shifter to the fourth phase shifter are connected to the third power divider, the fourth power divider, the fifth power divider, and the sixth power divider respectively, wherein the third power divider to the sixth power divider each have one input end and three output ends; the first antenna unit to the twelfth antenna unit are arranged in sequence; three output ends T11, T12, and T13 of the third power divider are connected to the first antenna unit, the second antenna unit, and the third antenna unit respectively; three output ends W21, W22, and W23 of the sixth power divider are connected to the tenth antenna unit, the eleventh antenna unit, and the twelfth antenna unit respectively; an output end T21 of the fourth power divider is connected to a fifth antenna unit; an output end T22 of the fourth power divider and an output end W11 of the fifth power divider are connected to two input ends of the third bridge, wherein two output ends V1 and V2 of the third bridge are a D port and an S port respectively and are respectively connected to the fourth antenna unit and the sixth antenna unit; an output end W13 of the fifth power divider is connected to the eighth antenna unit; and an output end T23 of the fourth power divider and an output end W12 of the fifth power divider are connected to two input ends of the fourth bridge, wherein two output ends Z1 and Z2 of the fourth bridge are an S port and a D port respectively and are respectively connected to the seventh antenna unit and the ninth antenna unit.

4. The base station antenna according to claim 3, wherein preset phase lines are connected between the first antenna unit to the twelfth antenna unit and the output ends of the second-level vector synthesis network.

5. The base station antenna according to claim 4, wherein the third bridge and the fourth bridge are 180-degree bridges.

6. The base station antenna according to claim 4, wherein either the first bridge or the second bridge is of the same type as the third bridge and the fourth bridge.

7. The base station antenna according to claim 1, wherein N=2 and M=6.

8. A base station antenna feed network, comprising: a first-level vector synthesis network, a second-level phase shifter array, and a second-level vector synthesis network, wherein:

the first-level vector synthesis network is configured to receive N vector signals output by N transceivers (TRXs) and implement vector synthesis for the N vector signals to generate M vector signals, wherein N and M are natural numbers and M is greater than N;

the second-level phase shifter array is configured to receive the M vector signals output by the first-level vector synthesis network, change phases of the M vector signals, and output M phase-shifted vector signals, wherein phase shift amounts of the M vector signals after passing through the second-level phase shifter array are an arithmetic progression; and the second-level vector synthesis network is configured to receive the M phase-shifted vector signals, divide the M vector signals into P vector signals, implement vector synthesis for Q vector signals in the P vector signals and output Q synthesized vector signals to an antenna unit array, and directly output a vector signal except the Q vector signals in the P vector signals to the antenna unit array, wherein P is a natural number and P is greater than M, and Q is a natural number and less than or equal to P.

9. The base station antenna feed network according to claim 8, wherein N=2 and M=4.

10. The base station antenna feed network according to claim 8, wherein N=2, M=4, P=12, and Q=4; the first-level vector synthesis network comprises a first power divider, a second power divider, a first bridge, and a second bridge; the second-level phase shifter array comprises a first phase shifter, a second phase shifter, a third phase shifter, and a fourth phase shifter; and the second-level vector synthesis network comprises a third power divider, a fourth power divider, a fifth power divider, a sixth power divider, a third bridge, and a fourth bridge, wherein:

the first power divider and the second power divider each have one input end and two output ends; the first power divider has output ends X1 and X2, and the second power divider has output ends Y1 and Y2, wherein the output end X1 of the first power divider and the output end Y1 of the second power divider are connected to two input ends of the first bridge; the output end X2 of the first power divider and the output end Y2 of the second power divider are connected to two input ends of the second bridge; output ends H1 and H2 of the first bridge and output ends S1 and S2 of the second bridge are connected to the first phase shifter, the second phase shifter, the third phase shifter, and the fourth phase shifter respectively, wherein the output ends H1 and H2 are a D port and an S port respectively, and the output ends S1 and S2 are an S port and a D port respectively; output ends T1, T2, W1, and W2 of the first phase shifter to the fourth phase shifter are connected to the third power divider, the fourth power divider, the fifth power divider, and the sixth power divider respectively, wherein the third power divider to the sixth power divider each have one input end and three output ends; the third power divider has output ends T11, T12, and T13; the fourth power divider has output ends T21, T22, and T23; the fifth power divider has output ends W11, W12, and W13; the sixth power divider has output ends W21, W22, and W23; the output end T22 of the fourth power divider and the output end W11 of the fifth power divider are connected to two input ends of the third bridge, wherein two output ends V1 and V2 of the third bridge are a D port and an S port respectively; and the output end T23 of the fourth power divider and the output end W12 of the fifth power divider are connected to two input ends of the fourth bridge, wherein two output ends Z1 and Z2 of the fourth bridge are an S port and a D port respectively.

11. The base station antenna feed network according to claim 10, wherein the third bridge and the fourth bridge are 180-degree bridges.

12. The base station antenna feed network according to claim 8, wherein N=2 and M=6.

* * * * *

UNITED STATES PATENT AND TRADEMARK OFFICE
CERTIFICATE OF CORRECTION

| | | |
|---|---|---|
| PATENT NO. | : 9,049,083 B2 | Page 1 of 1 |
| APPLICATION NO. | : 14/567247 | |
| DATED | : June 2, 2015 | |
| INVENTOR(S) | : He et al. | |

It is certified that error appears in the above-identified patent and that said Letters Patent is hereby corrected as shown below:

Title page, Item (72) Inventors, "Ming Al" should read -- Ming Ai --

Signed and Sealed this
Sixteenth Day of August, 2016

Michelle K. Lee
*Director of the United States Patent and Trademark Office*